Jan. 18, 1927.  
E. B. GALBREATH  
1,614,886  
SLIDING SLEEVE VALVE ENGINE AND BRAKE  
Filed July 15, 1924    3 Sheets-Sheet 1

Jan. 18, 1927.

E. B. GALBREATH 1,614,886

SLIDING SLEEVE VALVE ENGINE AND BRAKE

Filed July 15, 1924    3 Sheets-Sheet 2

INVENTOR
EDWIN. B. GALBREATH
BY
Graham Harris
ATTORNEYS.

Jan. 18, 1927.  1,614,886
E. B. GALBREATH
SLIDING SLEEVE VALVE ENGINE AND BRAKE
Filed July 15, 1924   3 Sheets-Sheet 3
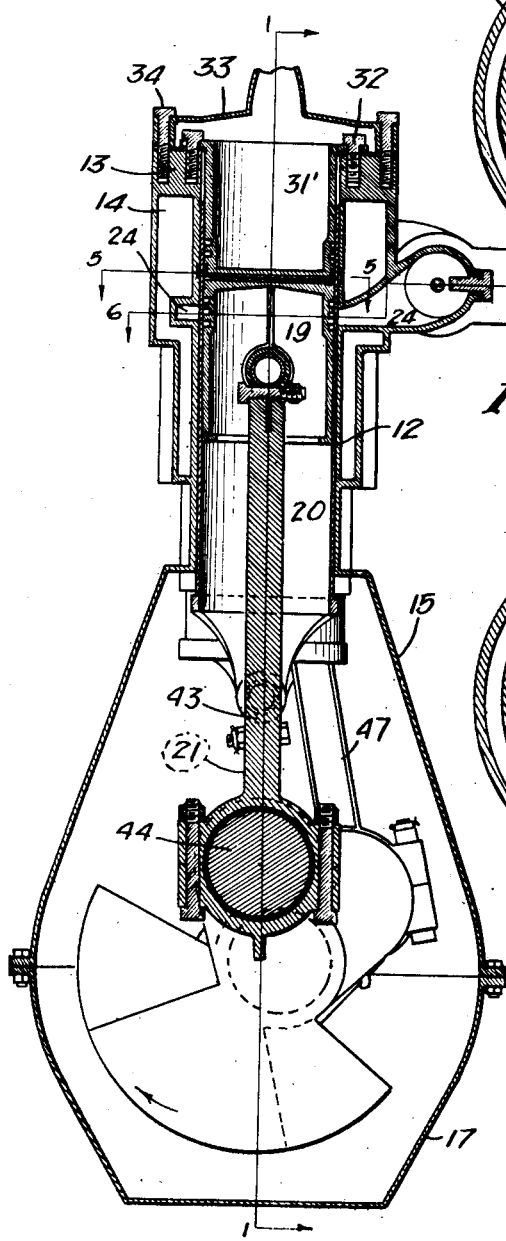
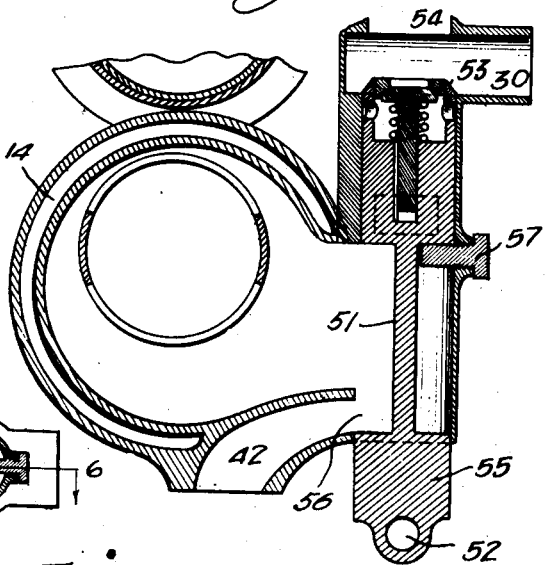
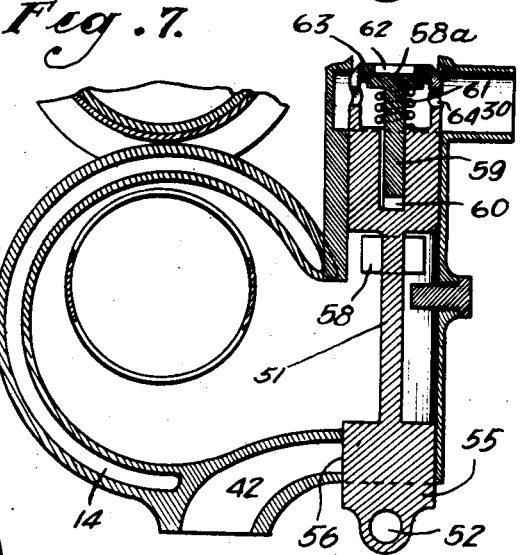
INVENTOR
EDWIN. B. GALBREATH
BY,
Graham Harris
ATTORNEYS Patented Jan. 18, 1927.

1,614,886

UNITED STATES PATENT OFFICE.

EDWIN B. GALBREATH, OF LONG BEACH, CALIFORNIA.

SLIDING-SLEEVE-VALVE ENGINE AND BRAKE.

Application filed July 15, 1924. Serial No. 726,114.

My present invention comprises a novel sleeve valve engine and brake in a unitary organization suitable for use upon motor vehicles, or the like; and it is an especial object of this invention to provide a high power engine, of improved efficiency, comprising a power cylinder distinct from a compression or pump cylinder, these cylinders being so arranged as to permit of the delivery of a compressed charge from the latter to the former, and preferably so arranged as to permit of a separate thermal treatment, involving a cooling of the compressor and a retention of heat in the power cylinder, in such manner as to gain a maximum expansion from a given charge.

It is an object of this invention to provide an engine of the general character referred to, wherein, without adverse effect upon the final compression, the dead gas space may be reduced to a very low figure, such as about 10 per cent.

To permit relatively complete expansion under harness, it is an object of this invention to provide an engine unit of the general character referred to in which the power cylinder is of substantially greater displacement than the intake or pump or compression cylinder; and, in an approved embodiment of my invention, this favorable relation of displacements may be effected by the use of a power cylinder having both a larger diameter and a longer stroke piston than the said compression cylinder; and the power piston, moving in said power cylinder, may also be connected with a crank so disposed as to be well off center when expansion due to explosion starts.

It is a further object of my invention to use, in connection with one or both of the cylinders of an engine unit of the general character referred to, sliding valves, each of which may be a sleeve valve of a comparatively large area and of an advantageous type hereinafter described, these valves being suitably timed by interconnection with driven parts, to predetermine in a favorable manner hereinafter set forth the periods and intervals between the introduction of a gaseous mixture into the compression cylinder, the compression of said mixture, the exit thereof into an intercommunicating passage provided with means for its explosion after communication into the power cylinder is opened, the initiation of said explosion, the exit of the exhaust gases, and the repetition of cycles comprising these events in a quiet, reliable and efficient manner; and, in one advantageous embodiment of my invention, the timing of the successive movements or events mentioned may be effected by means comprising a single crank shaft carrying not only the power crank and the compressor crank but an additional crank or cranks operating one or both of the mentioned valve sleeves.

A further and important feature of my engine is the incorporation of a novel brake system comprising a coaster brake, effective not only to save gas but to avoid wear upon brake linings; and, for this purpose, I may employ, in connection with the parts above referred to, a unique primary control device, manually operable from a distance, and placed at or near the outlet from my exhaust; and this control device may comprise novel safety features hereinafter described.

Further outstanding advantages of my novel engine or motor are the facts that it need comprise no springs or cams, tending to vibrate and liable to rapid wear, and no poppet valves or other valves of a type requiring to be reground; and my engine unit is such as to permit of counterbalancing, and a reliance, in its construction, only upon mechanical and thermodynamic principles, which although herein employed in a new way, rest upon tested and established practice.

Other objects of my invention will appear from the following description of an advantageous embodiment thereof, taken in connection with the appended claims and the accompanying drawings, in which Fig. 1 is a substantially central longitudinal section through an engine, or through one unit of an engine, embodying my invention. The direction of this view is indicated by the arrows of the lines 1—1 of Fig. 2 and Fig. 3.

Fig. 3 is a similar view taken, substantially as indicated by the line 3—3 of Fig. 1, through the separate compression or pump cylinder of my engine.

Fig. 4 is a transverse horizontal sectional view, with parts broken away, at the level of a spark plug and in substantially the plane indicated by the lines 4—4 of Figs. 1, 2 and 3.

Fig. 7 is a view similar to Fig. 6 but taken substantially on the line 6—6 of Fig. 3, and showing the coaster brake valve as closed.

Fig. 8 is a view similar to Fig. 7 but showing the coaster brake valve as wide open, and fuel passage also as open.

Figs. 9 and 10 are respectively diagrams exhibiting certain relationships of approximate position and movement which may characterize respectively the operation of my power crank, with its sliding valve crank, and the operation of my compressor or pump crank, with its sliding sleeve valve crank, and showing, also approximately, resultant features of the cycle of my engine as hereinafter described.

Figure 1:
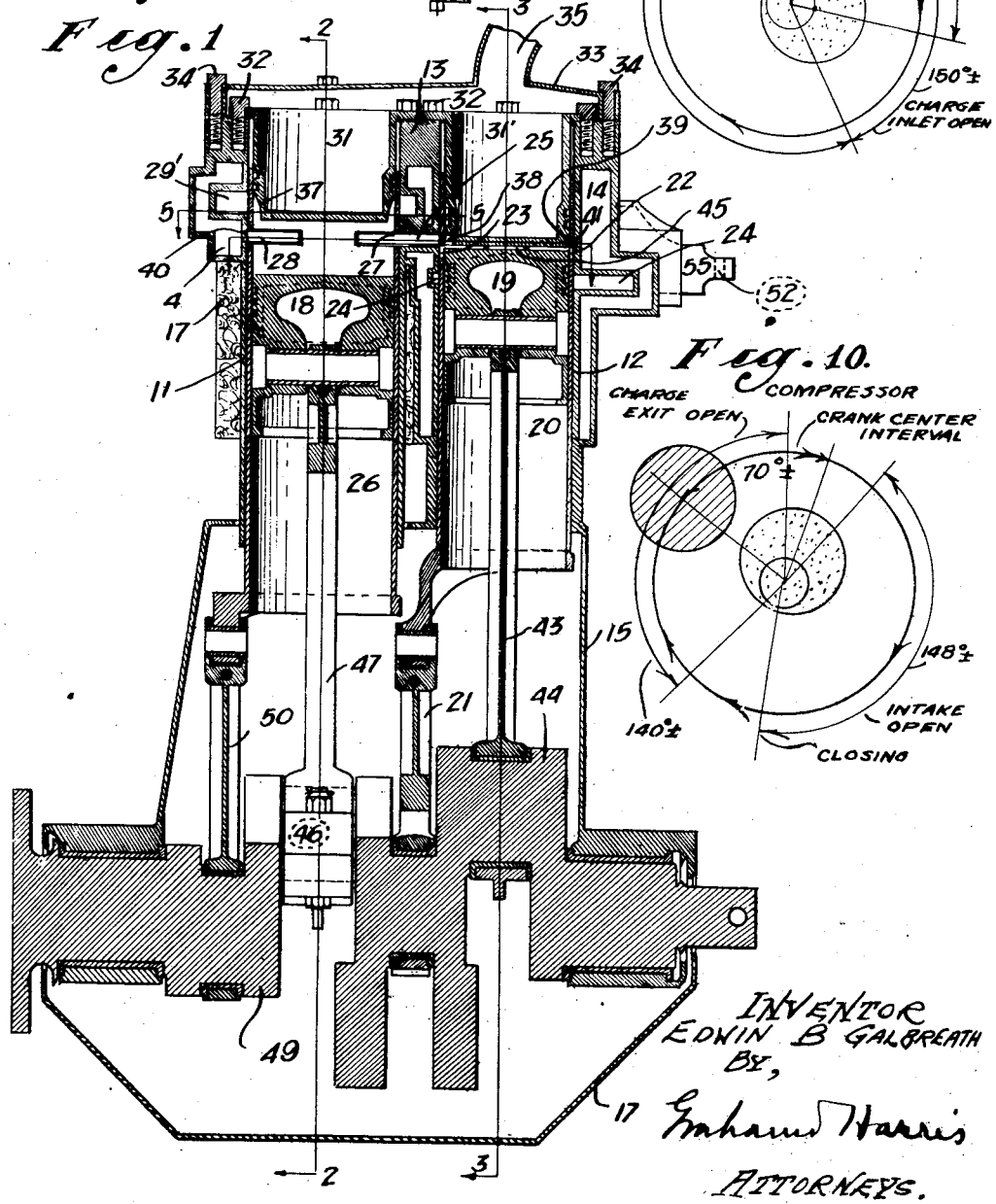
Figure 2:
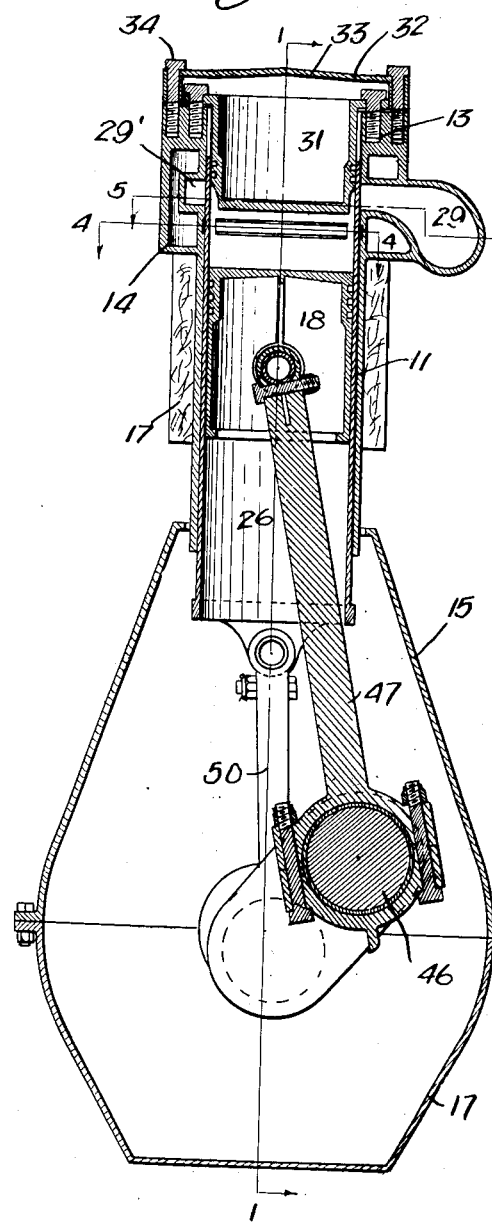
Fig. 2 is a vertical section taken, substantially in the plane indicated by the line 2—2 of Fig. 1, through the power cylinder of my engine.

In Fig. 9 the power crank is shown as if in section, at its uppermost position, the simultaneous position of its valve crank being indicated by a stippled circle; and in Fig. 10 the relative positions of the compressor crank and its valve crank at the same instant are approximately indicated in corresponding manner, additional information as to characteristics of my engine's cycle being indicated in each of these figures.

Referring to the details of that specific embodiment of my invention chosen for purposes of illustration, 11 may be a power cylinder, and 12 may be a compression cylinder arranged substantially parallel therewith; and both of said cylinders may be integral with a block 13, shown as provided with passages 14 for the circulation of a cooling liquid, and optionally integral or rigidly connected with the upper element 15 of a crank case, shown as secured by bolts 16 to a removable lower crank case 17. As shown, the power cylinder 11 may be substantially larger than the compression cylinder 12, and it may be provided with means, such as an insulation 17, for the retention of heat therein. Inside the respective cylinders mentioned I may provide any suitable pistons such as are shown at 18 and 19; and the movement of an explosive mixture to and from the compression cylinder 12 may be controlled by a sliding valve such as the sleeve valve 20, shown as movable by a rod 21 and as provided with openings 22 and 23, these openings being adapted to cooperate with an intake opening 24 in the main casting comprising the cylinder 12; and the outlet opening 23 may be adapted to permit exit of the compressed mixture into a communicating passage 25, extending through the cooled block 13. A sliding sleeve valve 26 may be interposed between the walls of the cylinder 11 and the power piston 18, this sliding sleeve being shown as provided with an inlet port 27 and an outlet 28, communicating at suitable intervals and for suitable periods with the passage 25, to permit the inflow of a compressed explosive mixture into the cylinder 11, and the port 28 may communicate in turn with an outlet passage 29, for the escape of exhaust gases.

The upper ends of the respective cylinders may be closed in any suitable way, as by means of separate hollow heads 31 and 31', shown as secured by screws 32; and a cooling fluid may be confined thereagainst by means such as a casing 33, shown as secured by means of additional screws 34 and as provided with a port 35 for the introduction or withdrawal of a cooling liquid.

Figure 6:
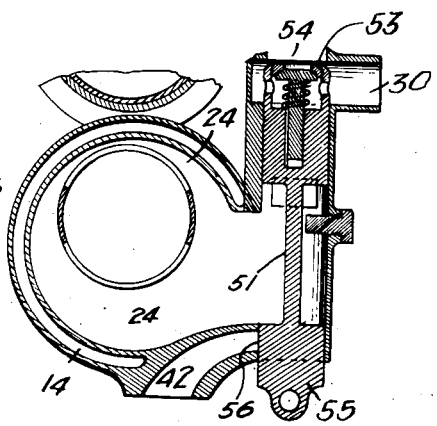
Fig. 6 is a view similar in general character but taken on the broken line 6—6 of Fig. 3, to exhibit additional details of valve structure and relationships, the coaster brake valve being shown as adjusted to a coasting position.
Figure 5:
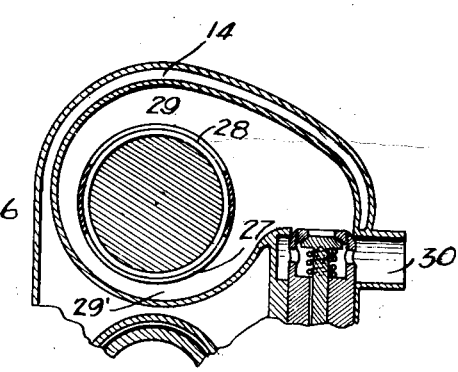
Fig. 5 is a similar view, taken substantially in the plane indicated by the lines 5—5 of Figs. 1 and 2, this view showing a coaster brake valve as closed, to produce a braking effect.

To facilitate the desired flow of gases, and to avoid unequal pressures, the exhaust gases may be permitted to exit not only through the passages 28 and 29, when the former passage is brought opposite the latter, but also through the inlet opening 27, when the latter is brought opposite the exhaust branch 29', forming (as is best shown in Fig. 5) part of an annular exhaust passage extending toward a final outlet opening 30, which may be provided with a special slidable primary control member, manually operable from a distance, as hereinafter described. The respective heads 31 and 31' may be reduced at the lower edges thereof, as at 37, 38 and 39, and the walls of the cylinders 11 and 12 may also be slightly cut away, as at 40 and 41, to permit of some equalization of pressure on opposite sides of the said valves, at the edges of the openings therethrough. The inlet passage 24 of the compressor cylinder 12 may be carried entirely thereabout, as best shown in Figs. 3 and 6, in a manner permitting the entrance of the explosive mixture, for compression, through both of the openings 22 and 23; and the mentioned primary control member may also predetermine the intake of an explosive mixture (as best shown in Figs. 6, 7 and 8), through a primary entrance 42, which may be connected with a manifold from a carbureter, not shown.

It will be understood to be a primary object of this invention to provide improved means for the placing of an unheated mixture of explosive gases under adequate compression, after being introduced through the port 24; and, for this purpose, I may so proportion the length of compression piston 19, as well as its connecting rod 43 and crank pin 44, as to leave a very small clearance at 45, when this piston is in its uppermost position; and I may provide such angular relationships between the compression crank pin 44 and a power crank pin 46 connected with the piston 18, and so proportion this latter piston and its rod 47, that the mixture forced into and through the communicating passage 25 in the block 13 shall be maintained under a comparatively high pressure up to the very moment of its explosion. This explosion may advantageously be effected by means such as a spark plug 48, shown as extending into the passage 25; and the dimensions and relationships of the parts referred to, and those of the sliding valves 20 and 26 (the latter being shown as connected with a crank 49 by a rod 50) may be such as to leave a dead air space approximating 10 per cent of its displacement.

By way of illustration, and whether or not the respective cranks above referred to are, as shown, integral parts of a single shaft, the power crank 46 and the compressor crank 44 may have an angular position some 50 degrees or more apart. The power cylinder valve crank may have (as best shown in Fig. 9) an angular lead of some 100 degrees in advance of the power crank, and the compressor valve crank may be positioned (as best shown in Fig. 10), some 70 degrees in advance of the compressor piston crank, these figures being, of course, merely approximate and illustrative and implying like relationships in time intervals.

In an organization such as that pictured in Fig. 10, the intake to the compressor may be opened during a crank movement through an arc of some 148 degrees, and the charge exit into the communicating chamber 25 may be opened during an interval of some 140 degrees. As shown in Fig. 9, the charge inlet into the power cylinder 11 may be open during the advance of the power crank through some 150 degrees; and the exhaust outlets may remain open during its rotation through some 210 degrees. As illustrated, communication between the respective cylinders is thus established just after the power piston passes top dead center; and such communication is cut off immediately after the compressor piston passes top dead center,—so that communication is prevented during the time that the compressor piston passes top dead center and until immediately after the power piston has passed top dead center; and scavenging of said power cylinder accordingly takes place during the rise of its associated piston. The strokes of the respective pistons 18 and 19 may be in a ratio such as about $5\frac{5}{7}$ inches to $4\frac{7}{7}$ inches; but it will be understood that all figures herein are given merely by way of example and are not necessarily the best ratios for use in any specific case.

The engine crank as a whole (including both power and fuel compressor cranks) is at its top dead center when the power piston, during its downward stroke, and the fuel compressor piston, during its upward stroke, are in such a position that the volume of compressed fuel forced into the power cylinder is approximately equal to the volume of compressed fuel remaining in the fuel compressor cylinder. The communicating passage and the portions of the mentioned cylinders containing the compressed fuel, when the engine crank as a whole is at its top dead center, constitute the combustion chamber hereinbefore mentioned.

Immediately after the crank for the power piston has passed its top dead center, communication is established between the power and fuel compressor cylinders, through the communicating passage and sleeve ports 23 and 27, and such communication is maintained until the crank of the fuel compressor piston has reached its top dead center. Thus ignition from a spark plug 48 in passage 25 may reach all parts of the mentioned combustion chamber.

In the efficient operation of the hereindescribed engine, thorough combustion should be established by the time the engine crank as a whole has reached its top dead center. In order to accomplish this, it may be desirable to time the ignition in advance of this instant, the amount of angular advance depending upon the quality of fuel used, the speed of the engine, the final compression, etc.

Immediately after the engine crank as a whole has passed its top dead center and combustion has been established as hereinbefore described, the fuel compressor piston forces the ignited gases from the fuel compressor cylinder into the power cylinder and the communicating passage. The communication between the fuel compressor cylinder and the communicating passage closes immediately after the crank of the fuel compressor piston passes its top dead center; and the intake stroke of the piston in the fuel compressor cylinder follows. The power stroke of the piston in the power cylinder follows immediately after the engine crank as a whole has passed its top dead center.

It is an important merit of the above novel organization that it is easily capable of a highly advantageous use in the production of a braking effect. As may be best appreciated from an inspection of Figs. 5 to 8, inclusive, a single slidable primary control member 51, having means such as an eye 52 to permit its manual operation from a distance, may be provided not only with a conical end 53 serving as a coaster brake valve and adapted to engage edges of an exhaust opening 54 in such a manner as to prevent the escape of exhaust gases, but also, at its opposite end 55, with an additional valve element in the form of an enlargement movable tranversely of an opening 56 for the admission of the explosive mixture. This primary control member, which may be retained by means such as a stop pin 57, may also be adapted variably to overlie an opening 58, through which, in certain positions of said control member, ordinary air may be permitted to enter. As a safety measure, to prevent the building up of an undesirable pressure within my engine, the coaster brake valve head comprising the conical element 53 may optionally be provided with a pressure limiting means such as the automatic valve 58ᵃ shown as having its stem 59 extending into a pocket 60 and as provided with resilient closing means in the form of a spring 61, the yielding of this spring under an excessive pressure being effective to permit the escape of air or gas through a central aperture 62 in a plug 63 and through lateral apertures 64, and thence to the outer air through the final exhaust opening 30.

Both of the pistons 18 and 19 are intended to operate with very small clearances; and the relationship therebetween is intended to be such that, the power crank having advanced somewhat more than 25 degrees beyond center before an explosion occurs, the two pistons may be at approximately equal distances from the heads of their respective cylinders at the moment of the explosion. All explosions are intended to occur at times when the ports to and from the communicating passage are both open, and when the density of the unheated but compressed explosive mixture is approximately at its maximum,—the larger piston, in the power cylinder, being then, as above indicated, in the beginning of its descending stroke. In this stroke, mechanical expansion may be developed approximately 34 per cent in excess of the compressor displacement.

In my Patent No. 1,307,045, granted June 17, 1919, I disclose a rotary engine comprising pairs of cylinders serving respectively for compression and for power development, these pairs being arranged in a circular series and all connected intermittently with a single explosion chamber, a rotating valve plate being employed, in a novel manner, to control all ports; and my present invention differs therefrom not only in that I use an ordinary crank shaft or crack shafts, preferably having an axle or axles extending at right angles to the axes of my compression and power cylinders, but also in the fact that each cylinder of my present engine is provided with its own sliding valve, and each pair of cylinders is provided with a restricted but direct connecting passage into which extends a separate spark plug, this construction obviating all necessity for a distinct common combustion chamber.

The combustion chamber of my present engine may be defined as including those portions of the cylinders which contain the fuel in its most highly compressed condition,—the moment of this highest compression being also a favorable instant for the ignition. My combustion chamber thus comprises the direct communicating passage and also those spaces between the respective pistons and the heads of the associated cylinders as measured at the time when the volumes of compressed fuel in their upper portions are approximately equal, and before the compressed and burning fuel is forced practically in its entirety into the power cylinder for power development. By making the communicating passage between the associated cylinders both direct and constricted, although perfectly controlled by the regulated coincidence of the inner openings through the separate sliding valves, and by making the clearances of the respective pistons very small, I assure the retention of an extremely low amount of dead or burned gas within the cylinder (and tending to retard the efficiency of successive charges of new fuel) without increasing the final compression beyond that of practice now standard.

An engine unit of the novel type herein disclosed is obviously capable of assembly in any usual or preferred arrangement, such as the familiar V arrangement, with stroke relationships effective to produce the effects of counterbalance; and it is of primary importance that, upon a suitable manipulation of the described primary control device, or its equivalent, fuel being cut off and an air inlet opened incidentally to the approximate or complete closure of the exhaust outlet passage, both cylinders of my engine may become effective, under the action of the ground wheels of a car in motion, in the pumping and compression of air, to produce a coasting or a complete breaking effect. If, for example, the compressor places air entering through the inlet 42 under a pressure of 90 pounds per square inch, the piston of my "power" cylinder, (which, as mentioned, is intended to have a very small clearance) may be effective to carry this pressure up to several hundred pounds, the partial or complete closure of the final exhaust opening being thus effective, without change in the functioning of the engine valves proper, to check the advance of the car; and these effects are all under the complete control of a driver by the manipulation of means such as my unique integral sliding primary control device from a remote point, except as a preliminary adjustment of the relief valve 58, by such means as the rotation of the threaded bushing 63 serving as a valve seat, may predetermine a maximum pressure within limits of safety.

Although I have herein described a single embodiment of my invention, it will be understood that various features thereof might be independently employed, and also that various modifications might be made, by those skilled in the art, without the slightest departure from the spirit and scope of my invention, as the same is indicated above and in the following claims.

I claim as my invention:

1. An internal combustion engine comprising: a two-cycle fuel compressor cylinder having a compressor piston movable therein, a two-cycle power cylinder having a power piston movable therein, said cylinders and pistons being interdependent and cooperative in their action, a combustion chamber comprising the upper parts of both of the mentioned cylinders and a direct communicating passage therebetween, crank pins for said pistons being spaced apart angularly to produce, by the consequent positioning of said pistons, a combustion chamber of a desired size, relatively to the piston displacement, means for admitting a fluid to said compressor cylinder, means for effecting an exhaust from said power cylinder by the upward stroke of said power piston; and means for controlling openings to and from said communicating passage.

2. An engine as defined in claim 1 in which communication between said cylinders depends upon the coincidence of apertures in valve elements separately movable relatively to said communicating passage and said passage containing a spark plug.

3. An engine as defined in claim 1 in which said cylinders and said communicating passage are formed in an integral engine block and said passage containing a spark plug.

4. An engine as defined in claim 1 in which an engine block comprising said cylinders is provided with a passage in which is a sliding element operating as a primary control device constituting a part of a braking system controlling an exhaust.

5. An internal combustion engine as defined in claim 1 provided with a manually operable device consisting of combined means for positively cutting off the admission of fuel to the compressor cylinder, admitting air to the said compressor cylinder and controlling the amount of exhaust from said power cylinder, to produce any exact amount of breaking effect desired.

6. An internal combustion engine comprising: a two-cycle fuel compressor cylinder provided with means for cooling the same and with a compressor piston which is connected with a crank on a shaft and is movable within said cylinder; a two-cycle power cylinder provided with means for retaining heat within the walls thereof and with a power piston which is connected with another crank on said shaft and is movable within said power cylinder,—said cylinders and pistons being interdependent in operation; a combustion chamber comprising parts of both of said cylinders and direct communicating passage therebetween,—said cranks being spaced apart angularly to produce, by the consequent positioning of said pistons, a combustion chamber of the desired size, relatively to the piston displacement; means for admitting a fluid to said two-cycle fuel compressor cylinder; means for effecting an exhaust from said two-cycle power cylinder by an upward stroke of said power piston; and means for controlling openings to and from said communicating passage.

7. An engine as defined in claim 1 in which the openings to and from the mentioned power cylinder are controlled by the same ports at a common level in a single sleeve valve.

8. An engine as defined in claim 1 in which the openings to and from the mentioned compressor cylinder are controlled by the same ports at a common level in a single sleeve valve and said passage containing a spark plug.

9. An organization as defined in claim 1 in which said cylinders are integral with a block provided with a direct communicating passage serving as part of a combustion chamber.

10. An internal combustion engine comprising: a compressor cylinder having a compressor piston movable therein; a power cylinder having a power piston movable therein, there being a direct communicating passage between said power cylinder and said compressor cylinder; a combustion chamber comprising parts of the above mentioned cylinders and said direct communicating passage therebetween; mechanically operable means for admitting a fluid to said compressor cylinder; means permitting an exhaust from said power cylinder; means for preventing communication between the said compressor and power cylinders during the scavenging of said power cylinder; and mechanically operable means for controlling openings to and from said communicating passage.

11. An internal combustion engine as defined in claim 10 provided with a manually operable device consisting of combined means for positively cutting off the admission of fuel to the compressor cylinder, admitting air to the said compressor cylinder, and controlling the exhaust from the mentioned power cylinder, to produce any exact amount of breaking effect desired.

12. An internal combustion engine as defined in claim 10 in which the openings to and from the mentioned power cylinder are controlled by the same ports at a common level in a single sleeve valve, and in which said engine is provided with a manually operable device consisting of combined means for positively cutting off the admission of fuel to the compressor cylinder, admitting air to the said compressor cylinder, and controlling the exhaust from the mentioned power cylinder, to produce any exact amount of breaking effect desired.

13. An engine as defined in claim 10 in which the openings to and from the mentioned compressor cylinder are controlled by the same ports at a common level in a single sleeve valve, and in which said engine is provided with a manually operable device consisting of combined means for positively cutting off the admission of fuel to the compressor cylinder, admitting air to said compressor cylinder, and controlling the exhaust from the mentioned power cylinder, to produce any exact amount of breaking effect desired.

14. An engine as defined in claim 10 in which the mentioned pistons and their associated valves are separately connected to actuating parts that are timed to the same speed, and in which said engine is provided with a single manually operable device comprising combined means for positively cutting off the admission of fuel to the compressor cylinder, admitting air to the said compressor cylinder and restricting or closing the exhaust from the mentioned power cylinder, to produce any exact amount of breaking effect desired.

15. An engine comprising a compressor cylinder and a power cylinder each provided with a piston and with engine valves; and means for rendering said engine as an entirety operable as a pump, to produce a braking effect, without changing the functioning of said engine valves.

16. An internal combustion engine comprising: a two-cycle fuel compressor cylinder provided with means for cooling the same and with a piston movable therein; a two-cycle power cylinder provided with means for retaining heat within the walls of the same and with a power piston movable therein,—said cylinders and pistons being interdependent in operation; a direct communicating passage between the said cylinders; a combustion chamber comprising parts of said cylinders and said direct communicating passage therebetween; mechanically operable means for admitting a fluid to said two-cycle fuel compressor cylinder; means for permitting exhaust from said power cylinder; means for preventing communication between said fuel compressor cylinder and said power cylinder during scavenging of the latter; and mechanically operable means for controlling openings to and from said communicating passage.

17. An internal combustion engine comprising: a two-cycle fuel compressor cylinder, provided with means for cooling the walls of the same; a two-cycle power cylinder provided with means for retaining heat within the walls of the same; a communicating passage through which the mentioned cylinders communicate during combustion intervals; a crank shaft; and a piston within each of said cylinders,—each piston being connected, by a suitable connecting rod, to a crank upon said crank shaft.

In testimony whereof, I have hereunto set my hand at Los Angeles, California, this 9 day of July, 1924.

EDWIN B. GALBREATH.